United States Patent [19]

Raulinaitis

[11] 4,095,632
[45] Jun. 20, 1978

[54] STRAIGHT EDGE CUTTING GUIDE FOR ROUTER AND CIRCULAR SAW

[76] Inventor: John M. Raulinaitis, 65 Union St., Cambridge, Mass. 02141

[21] Appl. No.: 820,476

[22] Filed: Aug. 1, 1977

[51] Int. Cl.² .............................................. B27C 5/10
[52] U.S. Cl. .................................. 144/136 C; 30/373; 83/471.2; 83/486; 83/745; 90/12 D; 269/304; 269/315
[58] Field of Search ...................... 83/485, 486, 486.1, 83/471.2, 471.3, 743, 745; 144/2 R, 134 D, 136 C, 134 R, 136 R; 30/372, 373; 269/304, 315; 90/DIG. 3, 12 D

[56] References Cited

U.S. PATENT DOCUMENTS

| | | | |
|---|---|---|---|
| 2,623,557 | 12/1952 | Kendall | 30/373 X |
| 3,011,530 | 12/1961 | Lamb | 83/745 |
| 3,045,724 | 7/1962 | Mitchell | 83/486.1 X |
| 3,389,724 | 6/1968 | Paul | 83/745 X |
| 3,635,268 | 1/1972 | Lange | 144/134 D |
| 3,757,628 | 9/1973 | Camacho | 83/745 |
| 3,869,951 | 3/1975 | Litwin | 83/745 |
| 3,979,987 | 9/1976 | Mayhew et al. | 83/745 |
| 4,023,273 | 5/1977 | Treleaven | 83/745 |
| 4,041,997 | 8/1977 | Selfe | 144/136 C |

Primary Examiner—Gil Weidenfeld
Assistant Examiner—W. D. Bray
Attorney, Agent, or Firm—James J. Cannon, Jr.

[57] ABSTRACT

A portable straight edge cutting guide for use with a router, circular saw, sabre saw and similar tools, including a hardwood straight edge and metal angle iron track assembly with adjustable clamps for mounting on a work surface, a removable bearing block assembly having three cam follower bearings which engage with and travel along said angle iron track, and interchangeable adapter plates secured to the bearing block assembly, conforming to the particular tool, which fasten to and travel with the bearing block assembly. A router or other tool is mounted on the appropriate adapter plate; its position relative to the workpiece is aligned by means of adjusting screws on the bearing block assembly, and is then guided along the length of the work piece by the manual movement of the bearing block along the track.

2 Claims, 5 Drawing Figures

STRAIGHT EDGE CUTTING GUIDE FOR ROUTER AND CIRCULAR SAW

BACKGROUND OF THE INVENTION

1. Field of the Invention

This invention pertains to portable straight edge cutting guides for use with portable power tools, and in particular to that type of cutting guide in which the tool moves reciprocally along an elongated straight edge by means of a bearing block assembly, and having means to change to other types of tools. In this particular invention the straight edge cutting guide assembly is secured to and supported by the workpiece.

2. Description of the Prior Art

The problem of making precise cuts and grooves in a workpiece is faced by every craftsman. A number of straight edge cutting guides are disclosed in the prior art for use in a shop or with large size power tools. However, the prior patent art and commercially available products provide little help to the craftsman working on a site where he has to use portable power tools such as a router, a circular saw, a sabre saw or the like.

Several previous examples of guiding apparatus for power tools power for the tool to be held in a fixed position, usually with the cutting blade extending upward, and for the workpiece to be moved across the blade. The orientation of the workpiece with respect to the blade must be maintained by continuously pressing the workpiece firmly against a mechanical stop, while simultaneously directing it toward the blade. If sufficient force is not maintained against the stop, or if the workpiece suddenly lurches forward due to the forces generated by the rapidly spinning blade, the workpiece can move away from the stop, causing non-uniformity in the straightness of the cut or ever irreparable damage. In addition, the exposed upwardly projecting cutting blade presents a definite safety hazard to the operator.

U.S. Pat. Nos. 3,869,951 and 3,979,987 were attempts at an apparatus in which the workpiece is held fixed, and the tool is moved along its surface by means of a movable fixture which fastens to the tool and which rides along a track which defines the straight edge. However in both cases, the movable fixture has a U-shaped receptacle or groove which accepts the track. In such a construction there must be a tight enough fit between the receptacle and the track to insure an unwavering straight line as the fixture is moved, yet there also must be sufficient clearance between the two contacting surfaces to minimize the drag caused by their sliding against one another. The tremendous amounts of dust created by the cutting operator will build up on the track and fill this clearance space, thereby increasing the drag. This causes uneven movement of the fixture, intermediate binding, and lack of overall control over the cutting operation, i.e. the operator feels the friction due to this mechanism rather than the more important sensation of the cutting blade progressing through the workpiece. Even lubricants on the track do not alleviate this problem but rather increase the adhesion of dust particles to the track and actually contribute to the problem.

The closest prior patent to the present invention is U.S. Pat. No. 3,979,987 which discloses a cutting guide for portable power tools. This device has two major limitations. First, its adapter plate and wedge combination will not accept all type of power tools commercially available. The present invention is designed to accept a variety of adapter plate corresponding to the variety of tools available. Second, the vertical metal flange and the inverted U-shaped carrier show provide too much metal-to-metal contact which can easily be jammed with sawdust or fine metallic particles, interferring with the operation of the device. The present invention solves this problem with the provision of three cam follower bearings which grip the vertical flange of the straight edge cutting guide assembly while minimizing metal-to-metal contact.

SUMMARY OF THE INVENTION

The object of this invention is to provide a method for assuring a precise straight cut in a workpiece by a router, a circular saw, or similar tool, using a mechanism which is inexpensive, simple to install an to align, and adaptable to a variety of applications.

The straight edge cutting guide of this invention includes a hardwood straight edge to whose length is rigidly attached a straight metal angle iron track, positioned to form a parallel open channel between itself and the hardwood. Toward each end of the hardwood straight edge are adjustment slots cut parallel to its length, through each of which protrude from the underside a carriage bolt and hardwood dowel attached to a hardwood clamp block. Each bolt and dowel combination can move along the length of its respective slot, permitting lateral movement of the hardwood clamp block, while maintaining the block's orientation parallel to the hardwood straight edge. Turning the wing nuts which are threaded onto each carriage bolt causes the two clamp blocks to be drawn closer to the hardwood straight edge, permitting the entire straight edge assembly to be clamped securely to a suitable working surface.

The straight edge cutting guide also includes a bearing block assembly which engages with and moves along the length of the vertical flange of the metal angle iron track, carrying with it the adapter plate to which either the router or the circular saw is attached. Toward either end of the bearing block are adjustment slots into each of which is inserted a socket head cap screw which passes completely through the bearing block and engages a threaded hole in the router or circular saw adapted plate which extends underneath. When the bearing block is properly engaged in the straight edge assembly, loosening these cap screws will permit the adapter plate, and consequently the router or circular saw, to be adjusted perpendicular to the direction of travel, allowing proper positioning relative to the workpiece.

The bearing block assembly also includes two cam follower bearings which are recessed into the side wall of the block, but whose outer surfaces extend slightly beyond the flat face of the block. These bearings are intended to contact the outer vertical flange of the metal angle iron track of the straight edge assembly.

Finally, the bearing block assembly includes a moveable outrigger bearing support arm, recessed into the top surface of the block, to the end of which arm is attached a third cam follower bearing. This bearing is intended to be positioned inside the aforementioned channel between the metal angle iron track and the hardwood straight edge, and to contact the inner surface of vertical flange of said track. The outrigger arm has adjustment slots which permit the arm to be moved perpendicular to the straight edge, drawing its attached cam follower bearing tightly against the inner surface of the track and simultaneously drawing the other two cam follower bearings tightly against the outer surface of the track. The outrigger arm's position is secured by tightening two socket head cap screws which are inserted into the arm's adjustment slots and engage threaded holes in the underlying bearing block. With the three cam followers thus straddling and firmly grasping the angle iron track, the entire bearing block assembly can be moved manually along the length of the straight edge assembly, thereby drawing the attached router or circular saw in a perfect straight line along the workpiece.

The cutting mechanism of this invention provides a means to enable any person to obtain a very precise straight cut in the workpiece by the simple attachment of the straight edge cutting guide to the workpiece and the bearing block assembly to his cutting tool. The unique adjustable locking of three cam followers along alternate vertical edges of a cutting guide assembly provides a means for the bearing block assembly to be aligned with a precision heretofore unobtainable. The clamping means utilized to secure the straight edge to the workpiece also provides an alignment heretofore unobtainable. The combination of a secure straight edge assembly and the bearing block assembly enables the user to make very precise cuts in the workpiece with a simple manual movement of his tool and bearing block assembly along the cutting guide.

DESCRIPTION OF THE PREFERRED EMBODIMENT

Figure 1:
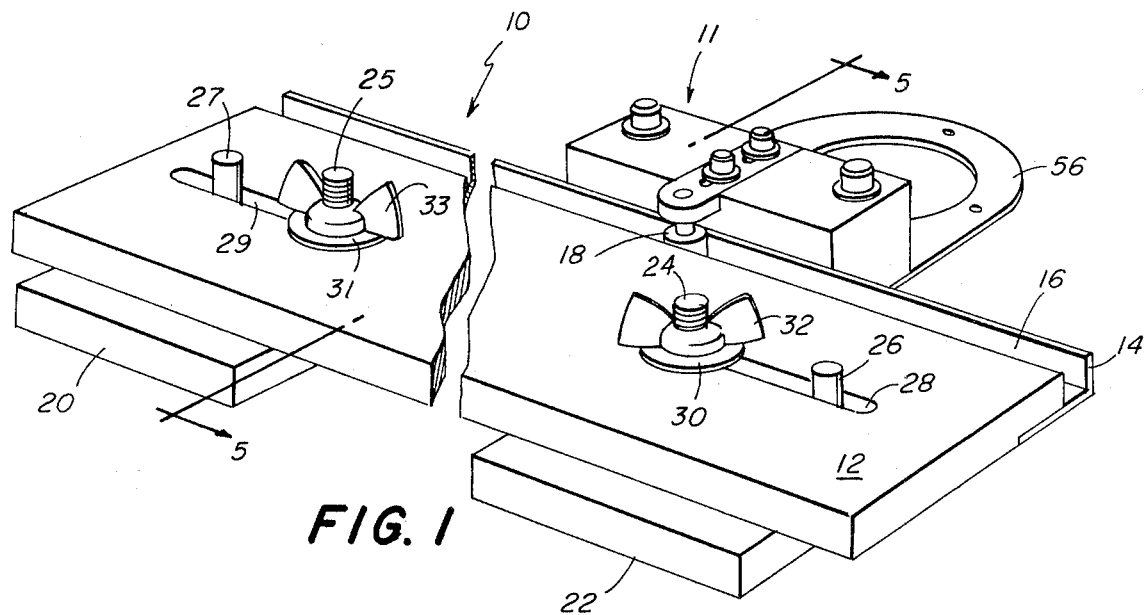
FIG. 1 is a perspective view of an exemplary embodiment of the cutting guide of this invention omitting the tool which would be attached to device of this invention.

With reference now to the drawings and more particularly to FIG. 1 thereof, there is shown a perspective view of the preferred embodiment of the invention, which is a straight edge cutting guide for use with a router, circular saw, or similar power tools.

This cutting guide has two basic asemblies, a hardwood and metal angle iron straight edge, designated generally by the reference numeral 10 and a bearing block assembly designated generally by the reference numeral 11.

Straight edge cutting guide 10 includes an elongated hardwood block 12 having an L-shaped metal angle iron 14 securely attached to one longitudinal edge thereof, thus forming an open channel 16 to accomodate a cam follower 18 as hereinafter described. Straight edge cutting guide 10 is longer than the workpiece on which it will be used such that its ends overhang the workpiece and that its ends can be fastened securely to the edges of the workpiece by means of hardwood clamp blocks 20, 22.

Figure 2:
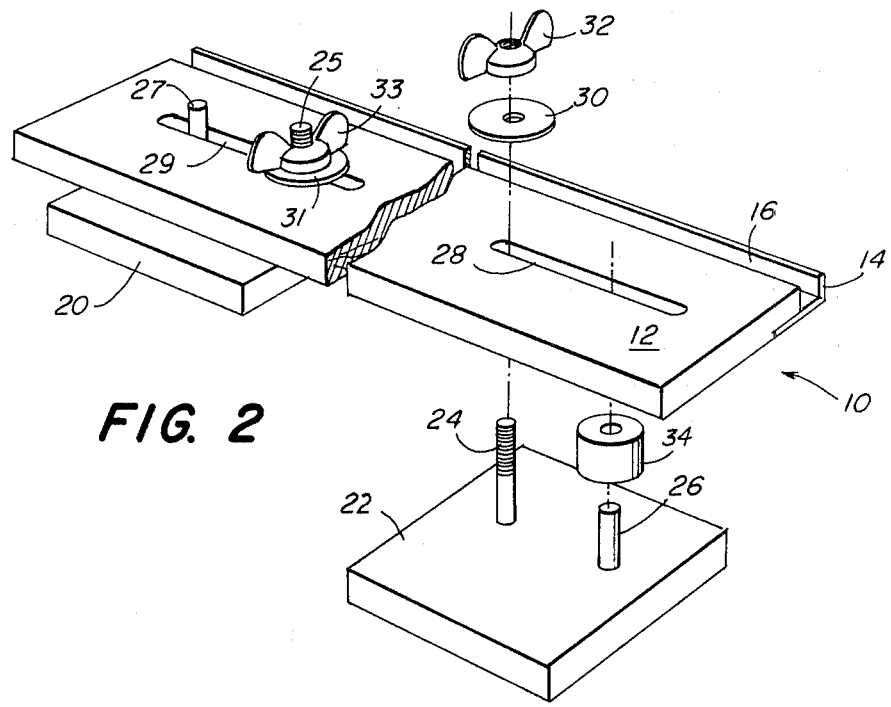
FIG. 2 is an exploded plan view of the clamping means and straight edge assembly.

Referring now to FIG. 2, a carriage bolt 24 and a hardwood dowel 26 protrude upwardly from clamp block 22 and completely through a slot 28 in straight edge cutting guide 10 near the right end thereof, such that clamp block 22 can grip one edge of the workpiece. A flat washer 30 and a wing nut 32 engage carriage bolt 24 above slot 28 in hardwood block 12, to secure clamp block 22 to the underside of hardwood block 12 and to the edges of the workpiece. Dowel 26 serves to prevent clamp block 22 from turning while it is being secured to hardwood block 12. Dowel 26 also serves to hold straight edge cutting guide 10 in alignment as the clamp blocks 20, 22 are being tightened. A hardwood spacer 34 is placed over dowel 26 between clamp block 22 and hardwood block 12 to maintain clamp block 22 in a position parallel to hardwood block 12 when pressure is exerted on straight edge cutting guide 10 by the tightening of wing nut 32. This also prevents a marring of the work surface and provides a firmer gripping surface. As wing nut 32 is turned clockwise, clamp block 22 moves closer to straight edge cutting guide 10, thereby exerting greater pressure to the top and one side of the workpiece, until straight edge cutting guide is fastened securely to the workpiece. An identical arrangement is followed for clamp block 20, using bolt 25, dowel 27, slot 29, flat washer 31 and wing nut 33. A similar spacer is not shown. Loosening wing nuts 32, 33 permits lateral adjustment of straight edge cutting guide 10.

Figure 3:
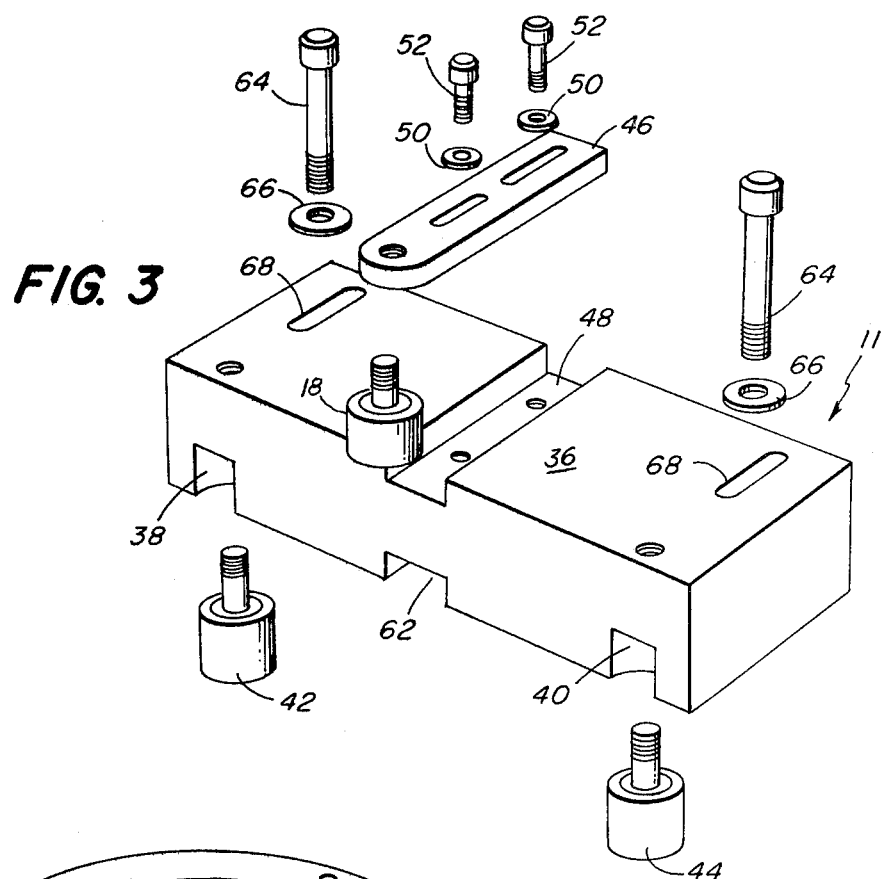
FIG. 3 is an exploded plan view of the bearing block assembly.

Referring now to FIG. 3, bearing block assembly 11 (without a guide plate shown in FIG. 4) is shown in an exploded view. Bearing block assembly 11 includes a bearing block 36 having two cavities 38, 40 cut into its leading edge. Two cam follower bearings 42, 44 are secured in cavities 38, 40, such that the roller surfaces of cam follower bearings extend slightly beyond the face of bearing block 36 and can thus engage the outer vertical flange of metal angle iron 14. An outrigger bearing support arm 46 is set into a centrally located lateral recess 48 in the upper surface of bearing block 36, and is held in place by flat washers 50 and socket head cap screws 52. Loosening screws 52 permits a transverse movement of outrigger support arm 46 with respect to bearing block 36. One end of outrigger support arm 46 extends beyond the front edge of bearing block 36 and a cam follower bearing 18 is suspended downward therefrom. Thus cam follower bearing 18 is centrally disposed between cam follower bearings 42, 44, but extends further forward transverse that its roller bearing surfaces can grip the inner vertical flange of metal angle iron 15. Thus cam follower bearing 18 will travel in channel 16 of straight edge cutting guide 10.

Figure 4:
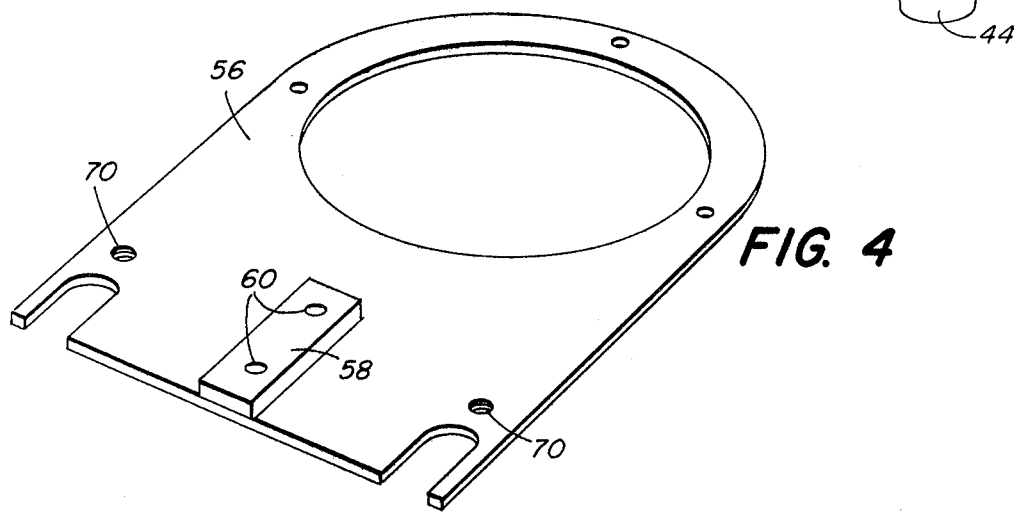
FIG. 4 is a perspective view of the adapter plate used with the router.

Referring now to FIG. 4, in conjunction with FIG. 3, an adapter plate 56 is shown which is secured to the base of bearing block 36, such that adapter plate extends outwardly in a direction opposite from the direction of outrigger support arm 46. Adapter plate 56 includes a guide block 58 secured to its inward end by rivets 60. Guide block 58 fits into recess 62 on the underside of bearing block 36. Adapter plate 56 is then held in position by socket head cap screws 64 which pass through flat washers 66, then extend through slots 68 in bearing block 36, and are secured into threaded holes 70 in adapter plate 56. Loosening screws 64 permits a tranaverse movement of adapter plate 56 with respect to bearing block 36. Adapter plate 56 as illustrated is designed for a router. With minor modifications, it is redesigned to fit a circular or other similar power tool.

FIG. 1 is a top perspective view of straight edge cutting guide 10, and bearing block assembly 11 interconnected as a working device with adapter plate 56 in position.

Figure 5:
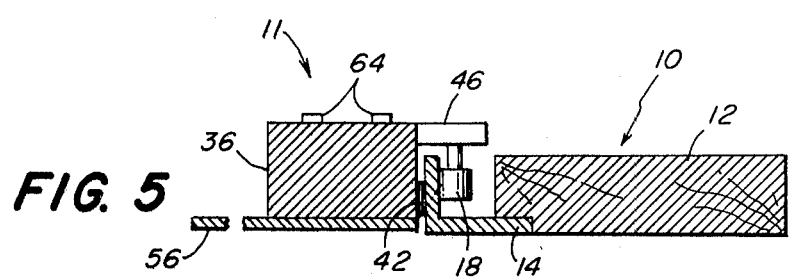
FIG. 5 is a cross-sectional view of the combined bearing block and straight edge assemblies taken alont line 7 — 7 of FIG. 5.

FIG. 5 is a cross-sectional view of the device of the present invention taken along the line 5 — 5 of FIG. 1. FIG. 5 shows how the three cam follower bearings 18, 42, 44 grip the vertical flange of metal angle iron 14, with cam follower bearing 18 travelling in channel 16 anc cam follower bearings 42, 44 gripping the outside of said vertical flange. Screws 64 are loosened and outrigger bearing support arm is positioned such that cam follower bearing 18 makes firm contact with the inside vertical surface edge of metal angle iron 14, thus positioning cam followers 42, 44 in solid contact with its outside edge. Screws 64 are tightened to maintain this alignment. This tight fit insures that as bearing block assembly is moved along straight edge cutting guide 10, the attached router or circular saw will make a very precise straight cut, as straight as that of straight edge cutting guide 10 itself.

Three distinct advantages over prior art are offered by this embodiment of the invention. First, the actual guiding surface used to define the straight line is a precisely machined metal track, and not the potentially uneven edge of the material being router or sawed. Second, the rigidity of the apparatus prevents it from being distorted or misaligned by the forces generated by the routing or sawing blades as they cut into the material being worked. This insures an unwavering straight line cut. Third the rolling action of the cam follower bearings on the track permits a smoother more friction free movement than would be afforded by the sliding action of a presently existing cutting guide against the rough edge of the workpiece.

I claim:

1. Guide apparatus for a tool having a cutting blade, including routers, circular saws, sabre saws and the like, comprising in combination:
    a straight edge assembly on which a bearing block assembly is movable including:
    a substantially straight hardwood bar;
    a substantially straight L-shaped metal angle iron track having a horizontal flange firmly attached along the entire length of said hardwood bar and having a vertical flange extending upwards at a uniform distance from said hardwood bar such that said L-shaped metal angle iron forms an open channel parallel to the longitudinal edge of said hardwood bar to receive a cam follower bearing;
    clamping means on each end of said straight edge assembly for securing said straight edge assembly to a workpiece;
    a movable bearing block assembly including:
    a main bearing block;
    two cam follower bearings positioned within machined recess in the vertical face of said bearing block, each of said cam follower bearings having an axis of rotation perpendicular to the bearing block assembly and having rolling surfaces extending equidistant forward of the vertical face of said bearing block;
    an outrigger bearing support arm mounted transversely to the top surface of said bearing block, extending forward of the vertical face of said bearing block, and having adjustment slots for alignment;
    a third cam follower bearing suspended vertically downward from the forward overhanging end of said outrigger bearing support arm, having an axis of rotation parallel to the axes of rotation of said first two cam follower
    bearings, being positioned forward of and between said first two cam follower bearings;
    said third cam follower bearing being positioned to move in said channel in said straight edge assembly, its rolling surface being positioned to grip the interior side of the vertical flange of said L-shaped metal angle iron;
    said first two cam follower bearings having their rolling surfaces being positioned to grip the exterior surface of said L-shaped metal angle iron;
    an adapter plate means fastened securely to said bearing block and extending outward therefrom for mounting a tool to said bearing block assembly;
    said bearing block assembly with said adapter plate secured thereto being able to move lengthwise along said straight edge assembly by means of said cam follower bearings such that a tool affixed to said adapter plate will make a straight cut.

2. The apparatus of claim 1 wherein said clamping means comprises:
    a plurality of rectangular hardwood blocks having substantially the same width as said hardwood bar;
    a carriage bolt and a hardwood dowel secured to each of said hardwood blocks and extending vertically upward therefrom along the central axis thereof;
    a cylindrical hardwood spacer with a central opening to fit around each hardwood dowel;
    a plurality of slots in said hardwood bar, each slot positioned to accommodate the carriage bolt and dowel of one of said hardwood blocks;
    said hardwood blocks being positioned under said hardwood bar and abutting each end of the workpiece with said carriage bolts and dowels protruding upward through said slots;
    a wing nut and a washer, for each of said carriage bolts to secure said hardwood block to said hardwood bar and to tighten said straight edge assembly to the workpiece.

* * * * *